(12) United States Patent
Myrah et al.

(10) Patent No.: US 8,356,198 B2
(45) Date of Patent: Jan. 15, 2013

(54) PERFORMING POWER MANAGEMENT BASED ON INFORMATION REGARDING ZONES OF DEVICES IN A SYSTEM

(75) Inventors: Michael G. Myrah, Tomball, TX (US); Balaji Natrajan, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 413 days.

(21) Appl. No.: 12/749,784

(22) Filed: Mar. 30, 2010

(65) Prior Publication Data

US 2011/0246803 A1    Oct. 6, 2011

(51) Int. Cl.
*G06F 1/32* (2006.01)
(52) U.S. Cl. .......................... 713/324; 713/320; 713/323
(58) Field of Classification Search .................. None
See application file for complete search history.

(56) References Cited

U.S. PATENT DOCUMENTS

| | | | |
|---|---|---|---|
| 6,587,950 B1 | 7/2003 | Shah | |
| 7,584,368 B2 | 9/2009 | Nichols | |
| 2007/0093124 A1* | 4/2007 | Varney et al. | 439/499 |
| 2007/0168498 A1* | 7/2007 | Lambert et al. | 709/224 |
| 2007/0220307 A1 | 9/2007 | Ishii | |
| 2009/0094620 A1* | 4/2009 | Kalwitz et al. | 719/325 |
| 2009/0094664 A1* | 4/2009 | Butler et al. | 726/1 |
| 2009/0132838 A1 | 5/2009 | Cherian | |
| 2009/0171511 A1 | 7/2009 | Tolentino | |
| 2009/0210726 A1 | 8/2009 | Song | |
| 2010/0088469 A1* | 4/2010 | Motonaga et al. | 711/113 |

OTHER PUBLICATIONS

Hewlett-Packard, Direct Connect SAS Storage for HP BladeSystem, Mar. 2009 (4 pages).
Maxim Application Note 4239, Storage Products, Advanced Enterprise Features Enable Next-Generation SAS systems, May 19, 2008 (pp. 1-6).
Liao et al., Managing Access Control Through SAS Zoning, Sep. 2005 (17 pages).
HP Article, SCSI Trade Association, Serial Storage Wire, May 2009 (3 pages).

* cited by examiner

*Primary Examiner* — Dennis M Butler

(57) ABSTRACT

One or more target components of a system that are not associated with an active initiator are identified, where the identifying is based on information regarding zones of devices in the system. The devices in each of the zones include at least one initiator and at least one target component accessible by the initiator. The information describes accessibility of devices between the zones. A power management procedure is performed with respect to the identified one or more target components that are not associated with an active initiator to place the identified one or more target components in a reduced power state.

16 Claims, 4 Drawing Sheets

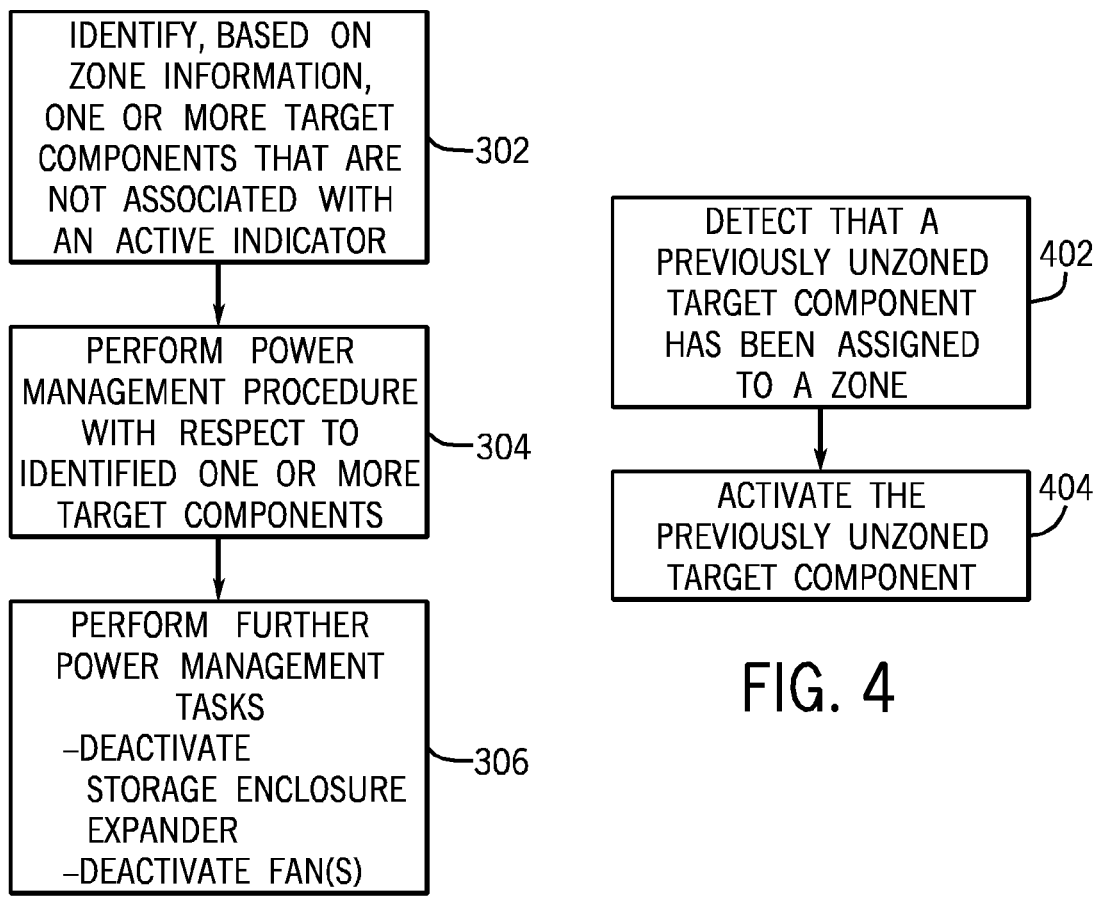

PERFORMING POWER MANAGEMENT BASED ON INFORMATION REGARDING ZONES OF DEVICES IN A SYSTEM

BACKGROUND

An enterprise (e.g., company, educational organization, government agency, and so forth) can have a relatively large number of computing devices, including desktop computers, notebook computers, storage servers, storage devices, communications devices, and so forth. The collection of computing devices can consume a relatively large amount of power. Power management mechanisms are typically associated with such computing devices to allow power savings to be achieved.

BRIEF DESCRIPTION OF THE DRAWINGS

Some embodiments are described with respect to the following figures:

FIG. 3 is a flow diagram of a process for performing zone-based power management according to some embodiments; and FIGS. 4 and 5 are flow diagrams of processes for activating previously deactivated target components, according to some embodiments.

DETAILED DESCRIPTION

In accordance with some embodiments, a power management mechanism is provided to perform zone-based power management in a system having zones of devices, where each zone includes at least one initiator and at least one target component. An initiator is able to access a target component to perform a requested action (e.g., such as to read or write data, to perform communications, or some other action). Zone information is provided that describes the zones of devices in the system, and the zone information also describes accessibility of devices within zones and between zones (in other words, the zone information describes which zones have access to which other zones). Based on the zone information, one or more target components (resources) not associated with an active initiator can be identified. Such one or more target components or resources are considered to be unused target component(s) or resource(s). A target component is not associated with an active initiator if all initiators that have access to the target component (as defined by the zone information) have one or more of the following conditions: deactivated (powered off or reduced power state such as sleep mode); experienced a fault or error that prevents normal operation; communications link is lost; or the target component is not assigned to any zone (as defined by the zone information). A power management procedure can be performed with respect to the identified one or more target components to place the target component(s) into a reduced power state (power off each such target component or otherwise place such target component in a state that consumes less power than a normal operating state of the target component).

Figure 1:
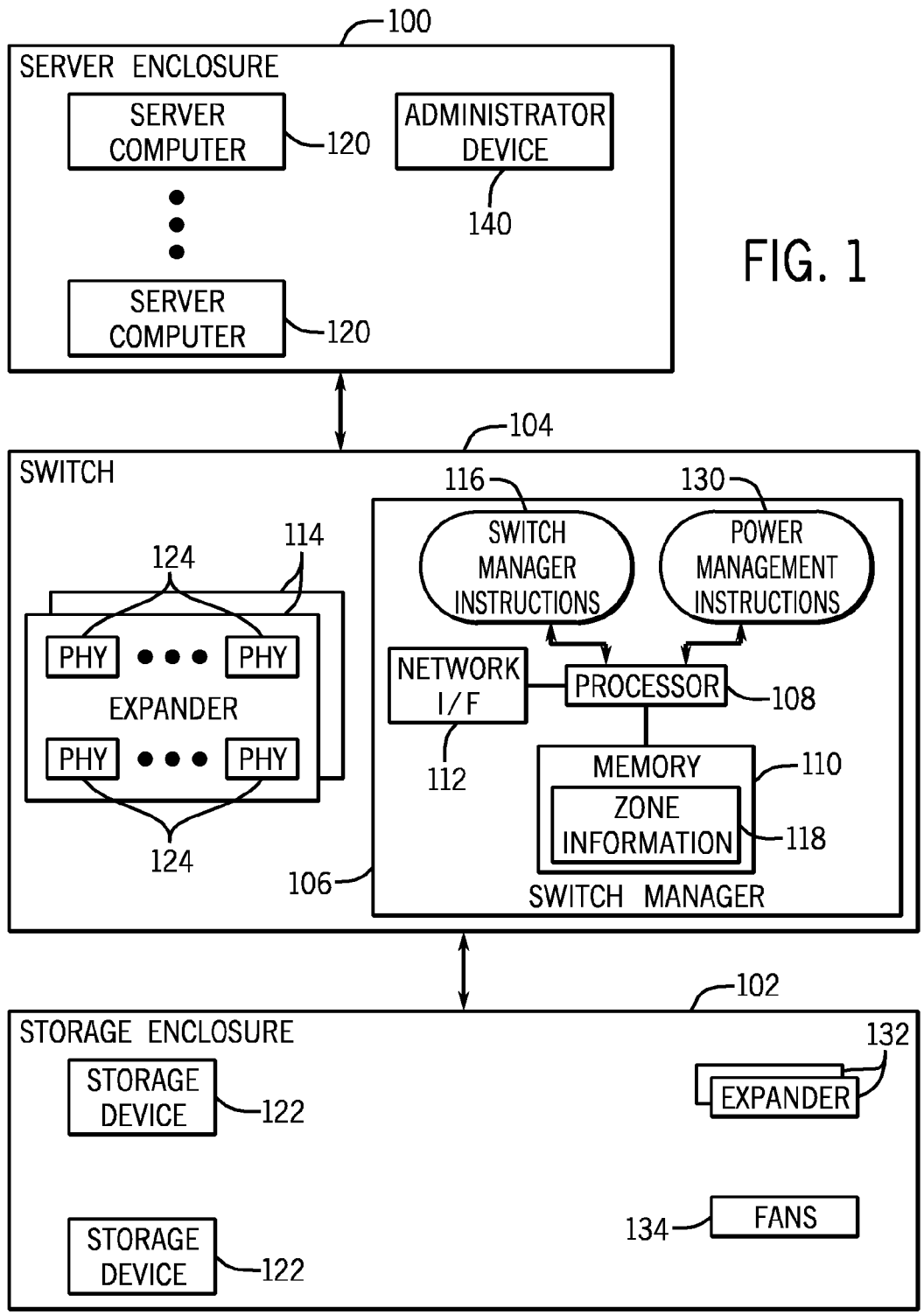
FIG. 1 is a block diagram of an example system incorporating a power management mechanism according to some embodiments.

FIG. 1 illustrates an example system that includes a server enclosure 100 (having server computers 120 such as blade servers or other types of electronic devices), a storage enclosure 102 (having storage devices 122 such as disk-based storage devices or other types of storage devices), and a switch 104 connected between the server enclosure 100 and the storage enclosure 102. Although the server computers 120 and storage devices 122 are depicted as being in separate enclosures in FIG. 1, it is noted that the server computers 120 and storage devices 122 can be in the same enclosure in alternative implementations. The server enclosure 100, according to some example implementations, can include an administrator device 140 to perform administrative tasks with respect to the server enclosure 100.

The switch 104 has a switch manager 106 configured to perform tasks associated with some embodiments. The switch manager 106 includes one or multiple processors 108, a memory 110, and a network interface 112 to allow communication between the switch manager 106 and at least one expander 114 of the switch 104. The switch manager 106 also includes switch manager machine-readable instructions 116 and power management machine-readable instructions 130 executable on the one or multiple processors 108.

As depicted in FIG. 1, the memory 110 stores zone information 118 that defines multiple zones of the system including the server enclosure 100, switch 104, and storage enclosure 102. A "zone" is a logical group of devices, including server computers 120 in the server enclosure, storage devices 122 in the storage enclosure 102, expander(s) 114 or portions of the expander(s) 114 in the switch 104, and expander(s) 132 in the storage enclosure 102. Multiple zones can be defined to provide more efficient traffic management and also to provide for security. Each zone includes at least one initiator as well as at least one target component. An initiator is able to initiate access of a target component to perform a requested action (e.g., such as to read or write data, to perform communications, or some other action). For example, the server computers 120 are considered initiators, while the storage devices 122 are considered target components that are accessible by the server computers 120 to read or write data. Other examples of target components include an expander 114 or 132, which is accessible by a server computer 120 (initiator) to reach a storage device 122. Yet another example of a target component is a phy (which is an abbreviation for "physical layer") that is part of the expander(s) 114 or 132. In FIG. 1, each expander 114 in the switch 104 includes a number of phys 124.

The expander(s) 132 in the storage enclosure 102 also include phys. The expander(s) 132 in the storage enclosure 102 is (are) used to connect the storage devices 122 to the switch 104. In alternative implementations, the expander device(s) 132 can be omitted.

The phys 124 are accessible by the server computers 120 to reach the storage devices 122. A "phy" provides the physical layer interface for communications.

An initiator of a given zone can access any target component within the given zone. However, the zone information 118 can define that an initiator in the given zone can only access some subset of one or multiple zones, where the subset of one or multiple zones can include just the given zone itself or one or multiple other zones. For example, if there are 64 zones (zone 0 to zone 63), then the zone information 118 can define that zone i (where i is any number between 0 and 63) can access only zone(s) j (where j is one or more numbers between 0 and 63). Based on the zone information 118, the switch 104 can determine what target components any given server computer 120 can access.

In accordance with some embodiments, the switch manager 106 also includes power management instructions 130 executable on the one or multiple processors 108 of the switch manager 106. The power management instructions 130 are able to determine, using the zone information 118, which target components are accessible by which initiators (server computers 120 in the example of FIG. 1). Based on the zone information 118, the power management instructions 130 are able to identify one or more target components of the system shown in FIG. 1 that are not associated with an active initiator. Such one or more target components are considered to be unused target components. The power management instructions 130 are then able to perform a power management procedure with respect to the identified one or more target components that are not associated with an active initiator to place the identified one or more target components in a reduced power state. For example, the identified one or more target components that are placed into a reduced power state can include one or more storage devices 122, one or more expanders 114, 132, and/or one or more phys 124.

Figure 2:
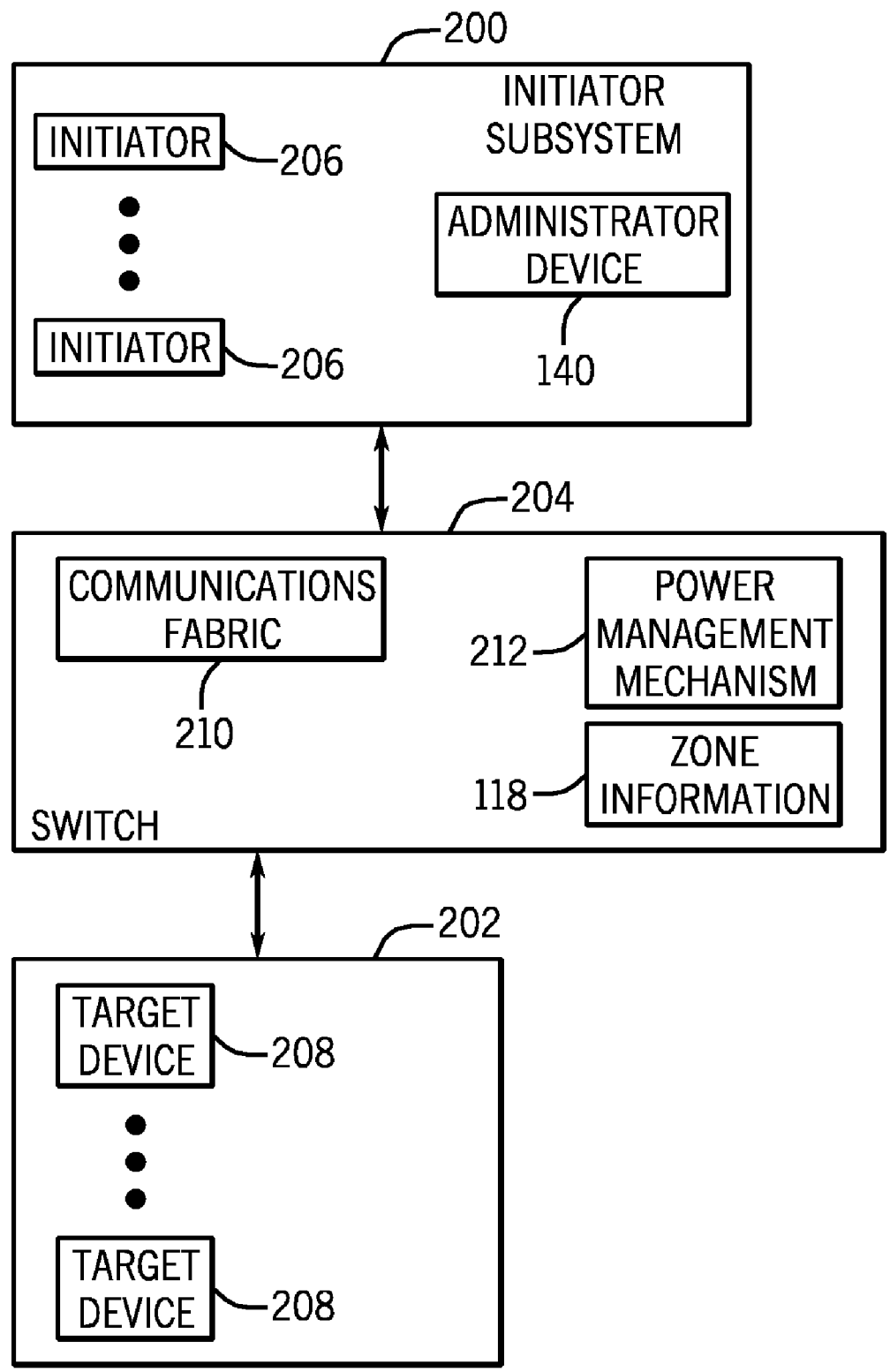
FIG. 2 is a block diagram of another example system incorporating a power management mechanism according to alternative embodiments.

FIG. 2 illustrates a more generalized block diagram of alternative embodiments. FIG. 2 depicts a system having an initiator subsystem 200 and a target subsystem 202 that are connected to each other through a switch 204. The initiator subsystem 200 includes initiators 206 that are able to access target devices 208 (e.g., data storage devices, communications devices, processing devices, etc.) in the target subsystem 202. The initiator subsystem 200 can also include the administrator device 140. The switch 204 includes a communications fabric 208 to allow connection of an initiator 206 to any target device 208, provided that such access is allowed by the zone information 118 maintained in the switch 204.

Note that as discussed above in connection with FIG. 1, the resources (e.g., expanders, phys, or other types of communications resources such as routers, etc.) of the communications fabric 210 can also be considered target components that are accessible by the initiators 206 for reaching the target devices 208 in the target subsystem 202.

In accordance with some embodiments, the switch 204 also includes a power management mechanism 212 (which can include one or more processors) that is able to access the zone information 118 for determining which target components 208 are accessible by which initiators 206 using which resources of the communications fabric 210. Based on this information 118, the power management mechanism 212 is able to identify target components (target devices 208 in the target subsystem 202 as well as one or more resources of the communications fabric 210) that are not associated with an active initiator. These identified target components are then placed into a reduced power state by the power management mechanism 212. An identified target component can be placed into a reduced power state by sending a command to the target component, asserting a deactivate signal to the target component, or by shutting off a power supply to the target component.

A target component is not associated with an active initiator in one or more of the following example scenarios. In a first scenario, initiator(s) (206 in FIG. 2 or 120 in FIG. 1) that has (have) access to the target component can be powered off or otherwise in a reduced power state in which the initiators do not perform any active access of a target device (208 in FIG. 2 or 122 in FIG. 1). A second scenario in which a target component is not associated with an active initiator involves initiator(s) that has (have) access to the target component has (have) experienced a fault or error that prevents the initiator (s) from normal operation. A third scenario in which a target component is not associated with an active initiator involves initiator(s) that has (have) access to the target component losing a communications link such that the initiator(s) can no longer access a target device (122 or 208 in FIG. 1 or 2).

A fourth scenario in which a target component is considered not to be associated with an active initiator is when a target component is not assigned to any zone defined by the zone information 118. Any target component (target device 208 or 122, or any resource of the communications fabric 210 such as an expander 114, 132 or phy 124) that is not assigned to a zone can be placed into a reduced power state.

In accordance with further embodiments, in addition to placing target components into a reduced power state, the power management mechanism (130 in FIG. 1 or 212 in FIG. 2) can also place other components into a lower power state, such as one or more fans 134 in the storage enclosure 102 shown in FIG. 1. In the example of FIG. 1, as more and more storage devices 122 are placed into a lower power state, then less heat dissipation would have to be provided, such that a smaller number of fans 134 would have to be kept active. As a result, a subset of the fans 134 can be turned off in view of the reduced number of active storage devices 122 in the storage enclosure 102.

In accordance with some embodiments, the system of FIG. 1 or 2 can be compliant with the serial attached SCSI (SAS) standard, where SCSI stands for Small Computer System Interface. SAS defines a protocol to move data to and from storage devices. The SAS standard is defined by the Technical Committee of the International Committee for Information Technology Standards (INCITS). According to SAS, an initiator is a device that originates device-service and task-management requests for processing by a target device, and receives responses for such requests. A target device according to SAS is a device containing logical units and target ports that receive device-service and task-management requests for processing, and send responses to such requests. According to SAS, an expander is a device that forms part of a service delivery subsystem to provide communication between initiator and target devices. As used here, reference to "SAS" refers to any previous or current standard of SAS, or any future standard that evolves from the current SAS standard, whether or not such future standard is referred to as SAS or serial attached SCSI, or by some other name.

In the SAS context, the power management mechanism according to some embodiments is able to send a SCSI STOP command to a disk-based based storage device to place the disk-based storage device in a reduced power state. The power management mechanism can also send a SCSI START command to the storage device to re-activate the storage device. In other contexts, other types of commands or signals can be used.

FIG. 3 is a flow diagram of a process of zone-based power management according to some embodiments. The process can be performed by the power management instructions 130 in the switch manager 106 of FIG. 1, or by the power management mechanism 212 of FIG. 2. The power management mechanism (130 or 212) identifies (at 302), based on the zone information (118 in FIG. 1 or 2), one or more target components that are not associated with an active initiator. As noted above, the zone information 118 describes zones of devices in a system, where the devices in each of the zones include at least one initiator and at least one target component accessible by the initiator, and where the zone information 118 describes accessibility of devices within zones and between zones.

A power management procedure is then performed (at 304) by the power management mechanism with respect to the identified one or more target components that are not associated with an active initiator to place the identified one or more target components in a reduced power state.

In accordance with some embodiments, further power management tasks can also be performed (at 306) to further reduce power consumption in the system. In one example, the power management mechanism can detect that a set of storage devices 122 in the storage enclosure 102 (FIG. 1) associated with a particular expander 132 in the storage enclosure 102 have been placed into a reduced power state. As a result, the corresponding expander 132 can also placed into a reduced power state.

In another example, the further power management tasks (306) can include deactivating one or more fans 134 (FIG. 1) of the storage enclosure 102, since deactivation of target components may mean that less heat dissipation has to be performed. In other examples, other components of the storage enclosure 102 (FIG. 1) or target subsystem 202 (FIG. 2) can be deactivated (placed into a reduced power state), or alternatively or in addition, further components of the switch (104 or 204) or server enclosure 100 or initiator subsystem 200 can be deactivated.

FIG. 4 illustrates an embodiment of re-activating a previously deactivated target component (a target component that has been placed into a reduced power state). The power management mechanism detects (at 402) that a previously unzoned target component has been assigned to a zone, such as based on receiving a notification that the zone information 118 has been updated. In response to detecting that such previously unzoned target component has been assigned to a zone, the previously unzoned target component is activated (at 404) by the power management mechanism. Activation of the target component means transitioning the target component from the reduced power state into a normal operating state.

Figure 5:
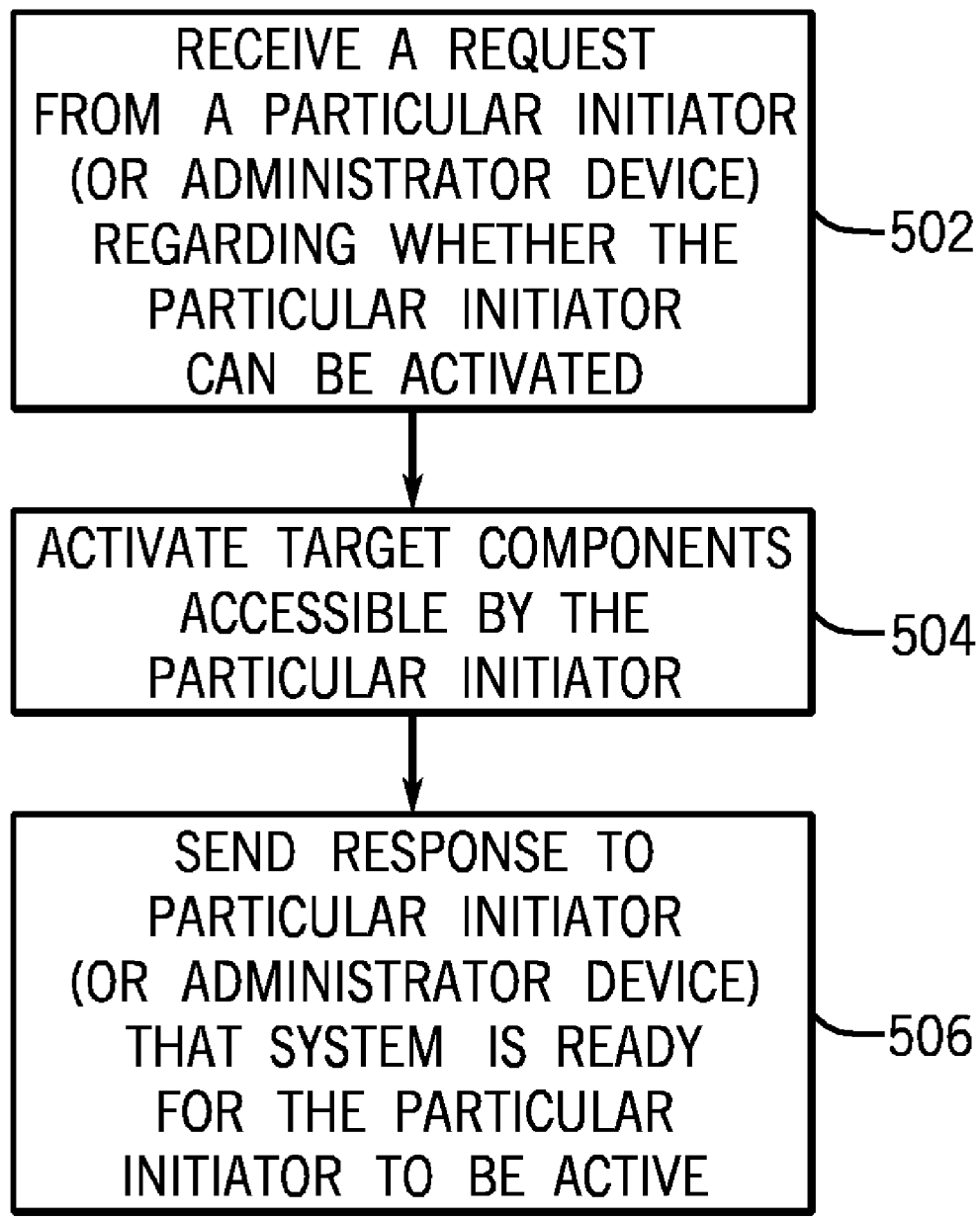

FIG. 5 illustrates another embodiment of activating previously deactivated target components. The process of FIG. 5 can be performed by power management mechanism in the switch 104 or 204 of FIG. 1 or 2. A request is received (at 502) from a particular initiator (120 in FIG. 1 or 206 in FIG. 2 or from the administrator device 140 associated with the particular initiator) regarding whether the particular initiator (which was previously inactive) can be activated. This request is sent by the particular initiator (or the administrator device 140) to ensure that target components accessible by the particular initiator (as defined by the zone information 118) are activated prior to activating the particular initiator device.

In response to the request, the power management mechanism activates (at 504) the target components that are accessible by the particular initiator. After activating the target components that are accessible by the particular initiator, the power management mechanism can cause a response to be provided from the switch (104 or 204) to be provided to the particular initiator (or the administrator device 140), where the response indicates that the system is ready for the particular initiator to be activated. At this point, the particular initiator or the administrator device 140 can activate the particular initiator.

Machine-readable instructions described above (including the switch manager instructions 116 and power management instructions 130 of FIG. 1) are loaded for execution on a processor. A processor can include a microprocessor, microcontroller, processor module or subsystem programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
identifying, by one or more processors, one or more target components of a system that are not associated with an active initiator, wherein the identifying is based on information regarding zones of devices in the system, wherein the devices in each of the zones include at least one initiator and at least one target component accessible by the initiator, wherein the information describes accessibility of devices between the zones, and wherein identifying the one or more target components that are not associated with an active initiator comprises identifying the one or more target components not assigned to any of the zones;
performing, by the one or more processors, a power management procedure with respect to the identified one or more target components that are not associated with an active initiator to place the identified one or more target components in a reduced power state;
detecting that a previously unzoned target component has been assigned to a zone, wherein the previously unzoned target component is one of the identified one or more target components; and
in response to the detecting, activating the previously unzoned target component from the reduced power state.

2. The method of claim 1, wherein identifying the one or more target components comprises identifying one or more of a data storage device and a communications resource.

3. The method of claim 2, wherein identifying the communications resource comprises identifying an expander or a phy.

4. The method of claim 1, wherein identifying the one or more target components that are not associated with an active initiator further comprises identifying target components that are accessible by one or more initiators that have powered down, been placed into a reduced power state, have experienced a fault, or that have lost communications.

5. A method comprising:
identifying, by one or more processors, one or more target components of a system that are not associated with an active initiator, wherein the identifying is based on information regarding zones of devices in the system, wherein the devices in each of the zones include at least one initiator and at least one target component accessible by the initiator, and wherein the information describes accessibility of devices between the zones;

performing, by the one or more processors, a power management procedure with respect to the identified one or more target components that are not associated with an active initiator to place the identified one or more target components in a reduced power state;

receiving, by the one or more processors, from a particular initiator or an administrator device associated with the particular initiator, a request indicating whether the particular initiator can be activated;

in response to the request, the one or more processors performing actions to activate the identified one or more target components; and after performing the actions, informing the particular initiator or the administrator device that the system is ready for the particular initiator to be active.

6. The method of claim 5, wherein the identifying and the power management procedure are performed by the one or more processors in a switch that connects the initiators to target devices.

7. The method of claim 6, wherein the switch includes at least one expander to selectively couple the initiators to the target devices.

8. The method of claim 5, wherein the identified one or more target components comprise target devices within an enclosure, the method further comprising:

in response to placing the target devices into the reduced power state, deactivating one or more expanders in the enclosure.

9. A method comprising:

identifying, by one or more processors, one or more target components of a system that are not associated with an active initiator, wherein the identifying is based on information regarding zones of devices in the system, wherein the devices in each of the zones include at least one initiator and at least one target component accessible by the initiator, and wherein the information describes accessibility of devices between the zones;

performing, by the one or more processors, a power management procedure with respect to the identified one or more target components that are not associated with an active initiator to place the identified one or more target components in a reduced power state, wherein the identified one or more target components comprise target devices within an enclosure that includes fans; and in response to placing the target devices into the reduced power state, deactivating one or more of the fans for further power consumption reduction.

10. A system comprising:

initiators;

target devices; and a switch connecting the initiators to the target devices, the switch to store zone information describing zones of the initiators and target devices, and describing accessibility between the zones, the switch further comprising one or more processors configured to:

identify resources that are unused, based on the zone information, wherein the unused resources include resources selected from among: one or more of the target devices and one or more communications resources;

perform a power management procedure to place the identified unused resources into a reduced power state;

receive from a particular initiator or an administrator device associated with the particular initiator, a request indicating whether the particular initiator can be activated;

in response to the request, perform actions to activate the identified unused resources; and after performing the actions, inform the particular initiator or the administrator device that the system is ready for the particular initiator to be active.

11. The system of claim 10, wherein the target devices include data storage devices, and wherein the one or more communications resources include one or more communications resources of the switch.

12. The system of claim 11, wherein the one or more communications resources include one or more expanders or phys.

13. The system of claim 10, wherein the initiators, target devices, and switch are configured to operate according to a serial attached SCSI (SAS) protocol.

14. The system of claim 10, wherein the one or more processors are configured to identify the unused resources based on one or more of:

detecting, based on the zone information, that the resources are not assigned to any of the zones; and detecting that the resources have powered down, been placed into a reduced power state, have experienced a fault, or have lost communications.

15. The system of claim 14, wherein the one or more processors are configured to further:

detect that a previously unzoned resource has been assigned to a zone, wherein the previously unzoned resource is one of the identified unused resources; and in response to detecting that the previously unzoned resource has been assigned to a zone, activate the previously unzoned resource.

16. An article comprising at least one computer-readable storage medium storing instructions that upon execution cause a switch to:

identify one or more target components of a system that are not associated with an active initiator, wherein the identifying is based on information regarding zones of devices in the system, wherein the devices in each of the zones include at least one initiator and at least one target component accessible by the at least one initiator through the switch, and wherein the information describes accessibility of devices between the zones, wherein identifying the one or more target components that are not associated with an active initiator comprises:

detecting, based on the information, that the one or more target components are not assigned to any of the zones; or detecting that the one or more target components are accessible by one or more of the initiators that have powered down, been placed into a reduced power state, have experienced a fault, or have lost communications;

perform a power management procedure with respect to the identified one or more target components that are not associated with an active initiator to place the identified one or more target components in a reduced power state;

detect that a previously unzoned target component has been assigned to a zone, wherein the previously unzoned target component is one of the identified one or more target components, and in response to detecting that the previously unzoned target component has been assigned to a zone, activate the previously unzoned target component; and receive, from a particular initiator or an administrator device associated with the particular initiator, a request indicating whether the particular initiator can be activated, and in response to the request, perform actions to activate the identified one or more target components, and after performing the actions, inform the particular initiator or the administrator device that the system is ready for the particular initiator to be active.

* * * * *